US011838039B2

(12) United States Patent
Smith

(10) Patent No.: US 11,838,039 B2
(45) Date of Patent: *Dec. 5, 2023

(54) CANCELLATION OF SPURIOUS INTERMODULATION PRODUCTS PRODUCED IN NONLINEAR CHANNELS BY FREQUENCY HOPPED SIGNALS AND SPURIOUS SIGNALS

(71) Applicant: Finesse Wireless, LLC, Park City, UT (US)

(72) Inventor: Francis J. Smith, Park City, UT (US)

(73) Assignee: FINESSE WIRELESS, LLC, Park City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/666,308

(22) Filed: Feb. 7, 2022

(65) Prior Publication Data

US 2022/0368363 A1 Nov. 17, 2022

Related U.S. Application Data

(63) Continuation of application No. 16/921,743, filed on Jul. 6, 2020, now Pat. No. 11,265,032, which is a (Continued)

(51) Int. Cl.
*H04B 1/10* (2006.01)

(52) U.S. Cl.
CPC .................... *H04B 1/1036* (2013.01)

(58) Field of Classification Search
CPC ...... H04B 1/10; H04B 1/0475; H04B 1/1027; H04B 17/11; H04B 1/123; H04B 1/1036; H04B 7/15585

See application file for complete search history.

(56) References Cited

U.S. PATENT DOCUMENTS 4,501,004 A 2/1985 Yoshida et al.
4,952,193 A 8/1990 Talwar
(Continued)

FOREIGN PATENT DOCUMENTS

EP 0505867 A2 9/1992
WO 2009/082084 A1 7/2009

OTHER PUBLICATIONS

Banelli, P., and G. Baruffa. "Mixed BB-If Predistortion of OFDM Signals in Non-Linear Channels." IEEE Transactions on Broadcasting, vol. 47, No. 2, 2001, pp. 137-146.
(Continued)

*Primary Examiner* — Nhan T Le
(74) *Attorney, Agent, or Firm* — Womble Bond Dickinson (US) LLP

(57) ABSTRACT

A method and apparatus for intermodulation product (IMP) cancellation. In one embodiment, the method comprises: acquiring copies of source signals that create IMPs in a passband of interest; creating copies of the IMPs for use as IMP cancellation signals by either multiplying the source signals together as a series of digital samples such that the multiplied signals create a near real and continuous time copy of the IMPs or creating a sum of the source signals in near real and continuous time and convolving the sum of the source signals with a mathematical model to effectively multiply the signals together to create a copy of the IMPs; adjusting one or both of phase and amplitude of the copies; and using the copies to cancel the IMPs inband of the passband of interest.

9 Claims, 4 Drawing Sheets

Related U.S. Application Data continuation of application No. 16/006,622, filed on Jun. 12, 2018, now Pat. No. 10,727,885, which is a continuation of application No. 15/165,993, filed on May 26, 2016, now Pat. No. 9,998,158.

(60) Provisional application No. 62/167,072, filed on May 27, 2015.

(56) References Cited

U.S. PATENT DOCUMENTS

| | | | |
|---|---|---|---|
| 4,995,104 A | 2/1991 | Gitlin | |
| 5,077,532 A | 12/1991 | Obermann et al. | |
| 5,596,439 A | 1/1997 | Dankberg et al. | |
| 5,619,536 A | 4/1997 | Gourgue | |
| 5,912,586 A | 6/1999 | Mitzlaff | |
| 5,926,513 A | 7/1999 | Suominen et al. | |
| 5,969,572 A | 10/1999 | Jeong et al. | |
| 5,978,362 A | 11/1999 | Lee et al. | |
| 6,005,506 A | 12/1999 | Bazarjani et al. | |
| 6,009,129 A | 12/1999 | Kenney et al. | |
| 6,108,385 A | 8/2000 | Worley, III | |
| 6,243,430 B1 | 6/2001 | Mathe | |
| 6,393,011 B1 | 5/2002 | Kim | |
| 6,539,204 B1 | 3/2003 | Marsh et al. | |
| 6,546,099 B2 | 4/2003 | Janse | |
| 6,549,067 B1 | 4/2003 | Kenington | |
| 6,611,570 B1 | 8/2003 | Subramanian | |
| 6,646,449 B2 | 11/2003 | Seppinen et al. | |
| 6,714,775 B1 | 3/2004 | Miller | |
| 6,724,840 B1 | 4/2004 | Osofsky et al. | |
| 6,745,018 B1 | 6/2004 | Zehavi et al. | |
| 6,894,630 B1 | 5/2005 | Massie et al. | |
| 7,313,370 B2 | 12/2007 | Branson | |
| 7,346,134 B2 | 3/2008 | Smith | |
| 7,359,683 B2 * | 4/2008 | Gilberton | H03F 1/3282 455/114.2 |
| 7,564,305 B2 | 7/2009 | Deisch | |
| 7,672,643 B2 | 3/2010 | Meng | |
| 7,773,967 B2 | 8/2010 | Smith | |
| 7,876,867 B2 | 1/2011 | Filipovic et al. | |
| 8,032,102 B2 | 10/2011 | Molnar et al. | |
| 8,098,779 B2 | 1/2012 | Komninakis et al. | |
| 8,170,487 B2 * | 5/2012 | Sahota | H04B 1/10 455/305 |
| 8,249,540 B1 | 8/2012 | Gupta et al. | |
| 8,351,543 B2 | 1/2013 | Kenington | |
| 8,805,298 B2 | 8/2014 | McCallister | |
| 8,855,580 B2 | 10/2014 | Dent et al. | |
| 8,874,153 B2 | 10/2014 | Bevan et al. | |
| 9,191,050 B1 | 11/2015 | Hwang et al. | |
| 9,344,122 B1 * | 5/2016 | Haddadin | H03F 3/189 |
| 9,548,775 B2 | 1/2017 | Smith | |
| 9,705,477 B2 * | 7/2017 | Velazquez | H04L 25/14 |
| 9,755,691 B2 | 9/2017 | Kim et al. | |
| 9,998,158 B2 * | 6/2018 | Smith | H04B 1/1036 |
| 10,284,235 B2 | 5/2019 | Thompson et al. | |
| 10,727,885 B2 * | 7/2020 | Smith | H04B 1/1036 |
| 11,265,032 B2 * | 3/2022 | Smith | H04B 1/1036 |
| 2002/0123308 A1 | 9/2002 | Feltstrom | |
| 2003/0021367 A1 | 1/2003 | Smith | |
| 2004/0048576 A1 | 3/2004 | Hildebrand et al. | |
| 2008/0107046 A1 | 5/2008 | Kangasmaa et al. | |
| 2009/0325509 A1 | 12/2009 | Mattisson et al. | |
| 2010/0136925 A1 | 6/2010 | Lackey | |
| 2011/0149714 A1 | 6/2011 | Rimini et al. | |

OTHER PUBLICATIONS

De Mingo, J., and A. Valdovinos. "Performance of a New Digital Baseband Predistorter Using Calibration Memory." IEEE Transactions on Vehicular Technology, vol. 50, No. 4, 2001, pp. 1169-1176.

Hausman, Howard. "Topics in Communication System Design: Carrier Triple Beats." Microwave Journal, Jan. 17, 2012, 12 pages.

Henn, Christian "Intermodulation Distortion (IMD)", Burr-Brown Application Bulletin, Apr. 1994, 9 pages.

Lohtia, Anita, et al. "Adaptive Digital Linearization of RF Power Amplifiers." University of Alberta, Edmonton, Alta., 1995, 7 pages.

Lui, P.L. "Passive Intermodulation Interference in Communication Systems." Electronics Communications Engineering Journal, vol. 2, No. 3, 1990, pp. 109-118.

Saleh, A.A.M. "Intermodulation Analysis of FDMA Satellite Systems Employing Compensated and Uncompensated TWT's." IEEE Transactions on Communications, vol. 30, No. 5, 1982, pp. 1233-1242.

Sea, R.G. "An Algebraic Formula for Amplitudes of Intermodulation Products Involving an Arbitrary Number of Frequencies." Proceedings of the IEEE, vol. 56, No. 8, 1968, pp. 1388-1389.

Treichler, John R. "Practical Blind Demodulators for High-Order QAM Signals" Signal Processing, vol. 86, No. 10, 1998, pp. 1907-1926.

Tsimbinos, John. "Identification and Compensation of Nonlinear Distortion." university of south Australia school of electronic engineering, Institute for Telecommunications Research, Feb. 1995, pp. 1-261.

* cited by examiner

CANCELLATION OF SPURIOUS INTERMODULATION PRODUCTS PRODUCED IN NONLINEAR CHANNELS BY FREQUENCY HOPPED SIGNALS AND SPURIOUS SIGNALS

PRIORITY

The present patent application is a continuation of U.S. patent application Ser. No. 16/921,743, filed on Jul. 6, 2020 which is a continuation of U.S. patent application Ser. No. 16/006,622, titled "Cancellation of Spurious Intermodulation Products Produced in Nonlinear Channels by Frequency Hopped Signals and Spurious Signals," filed on Jun. 12, 2018 which is a continuation of U.S. patent application Ser. No. 15/165,993 titled "Cancellation of Spurious Intermodulation Products Produced in Nonlinear Channels by Frequency Hopped Signals and Spurious Signals," filed on May 26, 2016 and claims priority to and incorporates by reference the corresponding provisional patent application Ser. No. 62/167,072, titled, "Cancellation of Spurious Intermodulation Products Produced in Nonlinear Channels by Frequency Hopped Signals and Spurious Signals," filed on May 27, 2015, both of which are incorporated in their entirety by reference.

FIELD OF THE INVENTION

The field of the invention relates to radio receivers and the mitigation of passive and active intermodulation products produced in nonlinear channels by both continuous spurious and frequency hopped signals.

BACKGROUND OF THE INVENTION

When signals are transmitted wirelessly through a nonlinear channel, they will mix with each other, self-mix and or mix with noise components in the channel creating unwanted signal components that create interference. Active intermodulation products are produced in the active components, such as, for example, amplifiers and mixers, during processing of wireless signal. Passive intermodulation products are generated after the amplifier by interaction with external materials such rusty components and external reflective surfaces.

FIG. 1 shows a typical example of an amplifier transfer curve. This type of transfer function is also generally representative of any non-linear channel. The 1:1 curve is known as the linear region of the amplifier and when the amplifier is driven beyond this range, the deviation from linear is experienced. The curved line is the compression curve of the amplifier. This can be modelled as a power series expansion such as $aX+bX^2+cX^3+dX^4 \ldots$ and power series expansions like this predict the higher order intermodulation products. All signals convolved with this transfer function are effectively multiplied together and this creates Intermodulation Products. Intermodulation Products (IMP) are of the order $2^{nd}$, $3^{rd}$, $4^{th}$ etc. In most cases, the even order IMPs will not fall inband, but if they do, they can be handled as described herein for odd order IMPs.

INTERFERENCE ENVIRONMENT

When high power out of band signals (source signals) are incident on the RF front end of a wideband receiver such as a cell phone, or cell phone base station, intermodulation products (IMPs) can be generated in the analog components of the receiver. These intermodulation products (IMPs) can have significant power. This is the case for cellular handsets which must receive the entire telephone band because the receiver does not have a prior knowledge of the channel to which it will be assigned. The channel selection is done after frequency down conversion because adjustable channel selection at RF is not practical and the insertion losses would be unacceptable.

Passive IPMs are created in the microwave components and structures after the transmitter filter and are thus not removed by the system filters and can land inband of the receive signals.

In cellular base stations, selective filters provide for rejection of adjacent channels that are not of interest, but passive IMPs can be generated by signals from the individual service provider and or other service providers because the source signals are out of band of the passband of interest, but the passive IMPs may not be and when they fall inband of the signal of interest, significant interference can be realized. The wideband LTE, Gen 4 and Gen 5 systems will make the passive IMP problem even more severe.

SUMMARY OF THE INVENTION

A method and apparatus for intermodulation product (IMP) cancellation. In one embodiment, the method comprises: acquiring copies of source signals that create IMPs in a passband of interest; creating copies of the IMPs for use as IMP cancellation signals by either multiplying the source signals together as a series of digital samples such that the multiplied signals create a near real and continuous time copy of the IMPs or creating a sum of the source signals in near real and continuous time and convolving the sum of the source signals with a mathematical model to effectively multiply the signals together to create a copy of the IMPs; adjusting one or both of phase and amplitude of the copies; and using the copies to cancel the IMPs inband of the passband of interest.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Techniques described below enable the cancellation of IMPs in the receiver, either passive or active IMPs, in continuous and near real time. The techniques handle IMPs generated by continuous signals, spurious and those generated by frequency hopped signals. Spurious IMPs can be managed by the time delay implementation described herein as well as the frequency hopped signals.

In one embodiment, the source signals that create the IMPs are captured in the receiver and are then isolated with digital or analog filters, and these signals are then multiplied together to create a copy of the IMP to provide an IMP cancellation signal.

In one embodiment, the source signals (those that create the IMPs) are digitally multiplied together sample by sample to create the IMP cancellation signal. As an example, if the sources signals are S1 and S2, then the cancellation signal is created by S1*S1*S2, S1*S1*S1, or S1*S2*S2 which creates IMP cancellation signals at 2F1-F2. 2F1-F1 and 2F2-F1, where F1 is the center frequency of S1 and F2 is the center frequency of S2.

As one skilled in the arts will recognize, the convolution of the sum of the signals that create the IMP with the nonlinear model of an amplifier will effectively multiply the signals together to create the IMP cancellation signals. This will create a multitude of IMPs and the required IMP cancellation signals are the filtered off from the full set of IMPs to create the IMP signals inband of the signal of interest (SOI) for the cancellation process.

Figure 1:
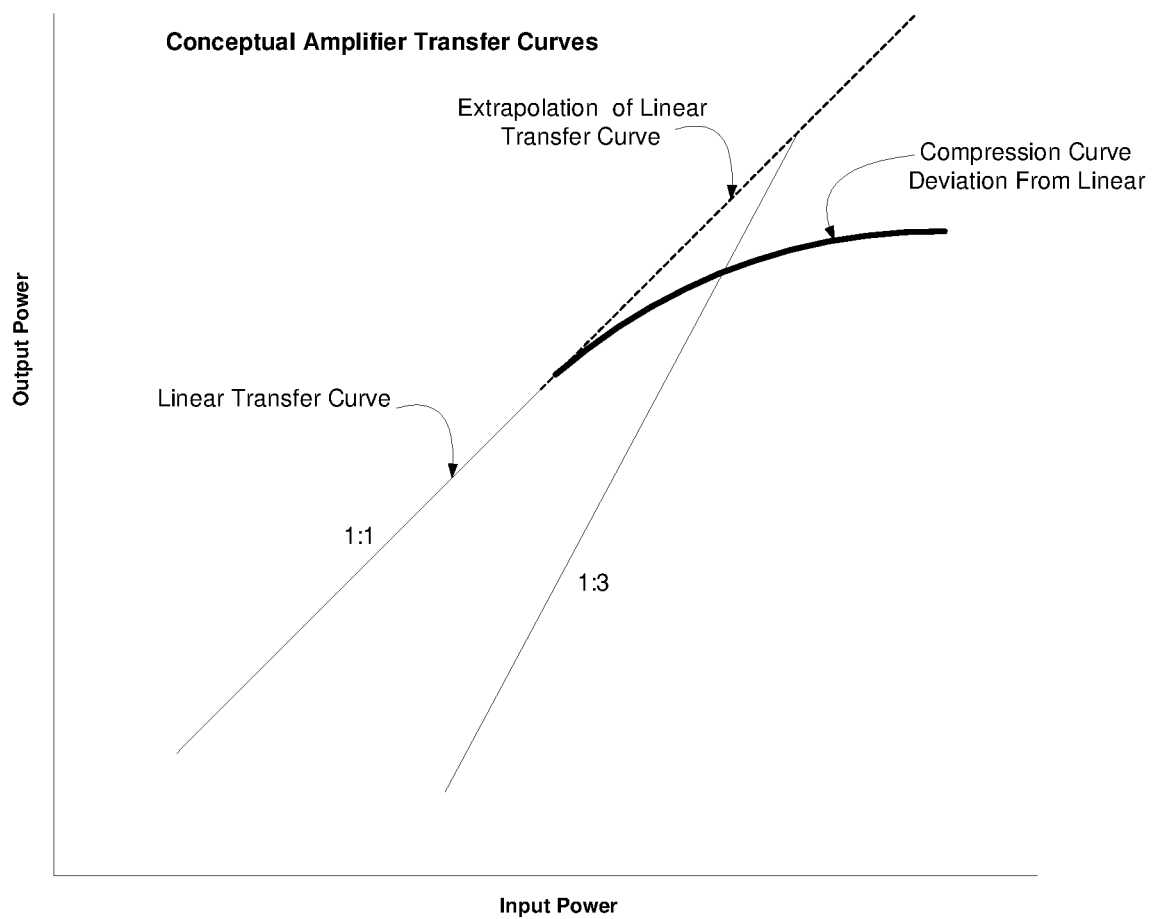
FIG. 1 is a conceptual drawing of the nonlinear transfer function of an amplifier or a nonlinear channel capable of generating active and or passive IMPS.

In another embodiment, a mathematical model of the amplifier or nonlinear channel shown in FIG. 1 (such as $aX+bX^2+cX^3+dX^4$ . . . ) is used and the sum of signals S1 and S2 is convolved with the transfer function of the amplifier/nonlinear channel to effectively multiply the S1 and S2 signals together. As one skilled in the arts will recognize, there are several mathematical models of the amplifier/nonlinear channel which will exhibit different compression curves that can be used with the techniques described herein.

In one embodiment, the source signals are continuous, over at least a short period of time at least, and the cancellation IMPs are generated by multiplying the signals together or convolving the sum of the signals with the transfer function of an amplifier or a composite of the nonlinear channel. The IMP cancellation signal(s) are then subtracted from the receive channel to cancel the IMPs generated by either the active or passive IMP generation mechanisms.

In one embodiment, the output of the IMP cancellation process is cross correlated with the IMP cancellation signal(s) and the phase and amplitude of the IMP cancellation signal is adjusted to reduce, and potentially minimize, the cross correlation, thereby optimizing the IMP cancellation process.

In one embodiment, the source signals are frequency hopped and the IMP cancellation process uses a short memory buffer to provide the IMP cancellation process to find the IMPs and set up the cancellation process.

In one embodiment, the full passband of frequency hopped signals is sampled and treated on one signal, where the frequency hopped band is one signal and it is multiplied by a continuous signal or another frequency hopped passband signal to create the IMP cancellation signal. This provides a "plethora" of time delays as a FIR filter with adjustable taps will do. In this embodiment, the sum of the signals is convolved with the amplifier/nonlinear channel transfer function to effectively multiply the source signals together to create the IMP cancellation signal(s).

In one embodiment, the IMPS are created in the channel as passive IMPs and not in the amplifier. In this case, the source signals are multiplied together sample by sample or the sum of the signals is convolved with a type of nonlinear transfer function such as $aX+bX^2+cX^3+dX^4$ . . . to effectively multiply the source signals together to create the IMP cancellation signals. As one skilled in the arts will recognize, there are a family of power series expansions that can describe a compression curve as shown in FIG. 1 and this does not detract from the general nature or application of this invention.

In one embodiment, the phase and amplitude of the IMP cancellation signal is controlled with an adaptive FIR filter or an adaptive IIR filter to accommodate not only linear phase and amplitude adjustment, but also to group delay to improve, and potentially optimize the IMP cancellation process.

In one embodiment, the phase and amplitude of the IMP cancellation signals are adjusted individually as separate functions to reduce, and potentially minimize, the cross correlation of IMPs process output and the IMP cancellation signal to reduce, and potentially minimize the cross correlation and thus improve the IMP cancellation process.

In one embodiment, the IMP cancellation signal is filtered by a copy of the matched filter for the signal of interest (SOI) from which the IMP signal is being removed. This provides for a filter matching of the IMPs in the SOI and the IMP cancellation signal.

In one embodiment, multiple IMPs are cancelled simultaneously as either a sum of IMP cancellation signals or as a parallel cancellation processes.

In one embodiment, the source signals consist of several source signals and when the sum of these signals is convolved with the amplifier transfer function, the sum of the IMPs that fall in the signal of interest are filtered in an SOI matched filter and multiple IMPs are cancelled simultaneously.

When a source signal that creates an IMP goes way, the IMP cancellation signal also goes away because one of the signals is effectively zero and when multiplying by zero, zero results. The process does contain a revisit mechanism to determine when an IMPs goes away so the cancellation process can get terminated so as not to add noise to the signal path.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Terms and Definitions

Channel: This is the electrical and radio frequency propagation path of the signals and includes the hardware components, atmosphere and free space.

Active nonlinear device: physical device that contains some sort of amplification and/or power translation, and in one embodiment amplifiers and mixers.

Passive Nonlinear Device: a physical device that creates nonlinearities without amplification. These include, but are not limited to waveguides, feeds and other signal transmission channels wherein nonlinear effects are experienced due to hardware element mismatch, oxidation and other physical degradations that cause nonlinear performance.

IMP: Intermodulation products: These are new signals created by the nonlinear effects in channels where signals self-mix and/or mix with other signals to create unwanted signals in the channels. In one embodiment, these are modeled as a power series expansion such as $aX+bX^2+cX^3+dX^4$ . . . and other power series expansions. These components are the result of signals being multiplied by themselves and other signals. There may be and often are more than one IMP signal in the channel, IMB: Intermodulation distortion. This distortion seen in a channel when active signals are present and is manifested by intermodulation products (IMP)

Source Signals: These are the signals from which IMPs are created in the nonlinear channels, both passive and active.

Signals of Interest (SOI): These are the desired signals in the channel and they are often interfered with by the IMP signals. There may be one or more SOIs in a channel.

Intercept points: As shown in FIG. 1, the intercept point is the location on the Input-Output curve of a nonlinear device where the 1:2, 1:3, 1:4 lines intercept the 1:1 curve (line), In FIG. 1, the $3^{rd}$ order intercept point is shown, IP3.

Intermediate frequency (IF): Communications signals are often processed within the transmitter and receiver hardware at frequencies that differ from the transmit frequencies. This is done for system performance reasons and the signals are converted to the Radio Frequency (RF) prior to transmission or from RF after reception.

Radio Frequencies (RFs): The radio frequencies are the frequencies of the signals that are used to transmit the signal thru the atmosphere or free space or other channels such as waveguide.

I and Q channels: In analog and digital signal processing, passband signals are often separated into orthogonal channels referred to as I and Q.

As one skilled in the arts will recognize, the methods described in the invention are applicable to both even and odd IMPs.

Spurious IMPs

Spurious IMPs can be generated as either active or passive IMPs Spurious IMPs can result from spurious signals in the transmit and/or receive paths of the communications system. Spurious IMPs may not be present, but in one embodiment, the processors scan the receive environment for spurious IMPs an if they exist, the search algorithms search for the spurious source signals and delay the IMP cancellation and the SOI path to allow time for the IMP cancellation signals to be generated and the IMPs in the passband of interest to be cancelled.

As shown in FIG. 1, the 1:3 line predicts the amplitude of the $3^{rd}$ order IMP given the input power of the source signals, and the input third order intercept point IP3 can be obtained with the techniques described herein, although it is not required for the IMD mitigation. The higher order intercepts points for the higher order distortions can also be obtained. Additional lines, such as, for example, 1:5 and 1:7 and 1:9 lines could also be drawn, but are omitted here to avoid congestion. The methods described herein for generation of $3^{rd}$ order IMPs are readily extendable to the higher order IMPs as one skilled in the arts will recognize. The dominate IMP is normally the $3^{rd}$, so the $3^{rd}$ is used herein for discussion and description of the invention. As one skilled in the arts will recognize, the methods used for $3^{rd}$ order IMPS are readily extended to the $5^{th}$, $7^{th}$, $9^{th}$ order IMPs.

Wideband Multi-Signal Source Signals

In one embodiment, wideband signals or multiple signals comprise the source signals in the band. In one embodiment, the entire ensemble signals set is cubed, sample by sample, to create a composite $3^{rd}$ order IMP signal set. This set of signals is then filtered with a SOI filter to only pass those IMP components that fall inband of the signal of interest. This filtered IMP cancellation signal is then used to cancel the IMPs inband of the SOI. The output of the cancellation process is cross correlated with the IMP cancellation signals and the phase, amplitude and group delay of the composite IMP cancellation signal is adjusted to reduce the cross correlation and improve the IMP cancellation process. As one skilled in the art will recognize, this process is extendable to $5^{th}$, $7^{th}$ and $9^{th}$ and higher order IMPs The signal of interest (SOI) and the source signals that create IMPs can be frequency hopped such as is optional in GSM, GPRS, EDGE and other standards and the frequencies can be hopped on the order of 0.5 msec in a pseudo random fashion. The IMP cancellation system provides the capability to detect the interfering signals and cancels the interference in near real time (NRT). This is accomplished by introducing a small delay such as 0.1 msec delay and continuously cancelling the interfering signals as will be discussed below. As one skilled in the art will recognize, different delays in the architecture, to accommodate different frequency hopping rates, do not detract from the general nature an application of this invention.

The specified interference environment for CDMA2000 requires a two tone test with the interfering signals at −21 dBm and the SOI at −94 dBm. When the interfering signals are not present, the sensitivity requirement is −119.6 dBm. CDMA2000 gives up 25 dB in the presence of high power intermodulation products (IMP). GSM, GPRS, EDGE and WCDMA set the requirements for the source signals at −49 dBm. All of these systems can operate in the same environment. The −49 dBm requirement assumes that the handset is at least 250 meters from an offending base station. The frequency hopped option in GSM, GPSR and EDGE will mitigate the higher power interferes to some degree especially for voice services, which can tolerate a lot of outages and still deliver acceptable, but not totally desirable, performance. The data services may be impacted to a much higher degree.

System Overview

The following system overview is not intended to be a limiting case of the invention, but to serve as an illustrative example of the invention.

The example system, described in detail below, samples the entire receive band with at low resolution (4 to 8 bits) and then conducts a fast search to locate the energy which can produce an IMP within the SOI bandpass. Source signals that do cannot contribute to SOI inband interfering IMPs are not processed. The source signals that do have sufficient power and proper frequency spacing as required to produce an inband IMP are isolated and used to generate an estimate of the inband IMP. The estimate of the IMP is generated by multiplying the source signals together or are put through a nonlinear model that approximates the nonlinear elements that produce the IMPs. As one skilled in the arts will recognize, the nonlinear model can be an approximation of an amplifier compression curve or multiplying the signals together. Both are nonlinear models. After appropriate phase and amplitude adjustment, the estimate of the IMP is used to cancel the IMP within the SOI. The source signals may and often do fall outside the passband of interest and are rejected in and of themselves with adjacent channel rejection filters, but this does not help with IMPs when they fall inband.

The process path for the SOI is parallel to the IMP search and path for the SOI is processed at much higher resolution. The cancellation process does not require a high degree of resolution. If the cancellation process in accurate to 3 bits, the system will realize 18 dB of interference cancellation. As one skilled in the art will realize, if the SNR on the source signals is good and more effective bits are realized in the sampling process, the IMPs cancellation process may be accurate to many more bits and the suppression of the IMPs will be greater.

IMP Cancellation with Frequency Hopped Jamming Signals System Block Diagram

Figure 2:
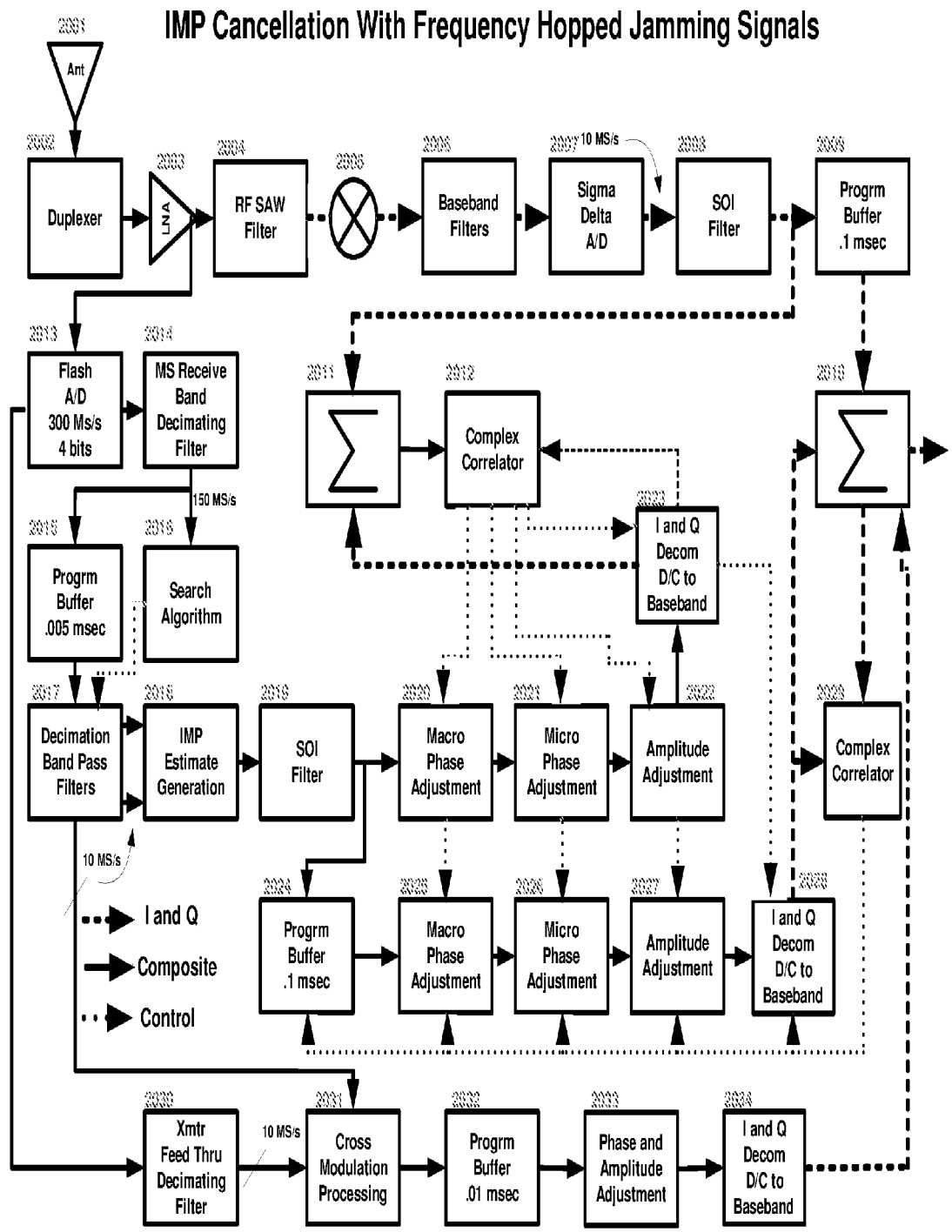
FIG. 2 is a system block diagram of an instantiation of an IMP cancellation process with frequency hopped source signals.

The system block diagram for the cancellation of frequency hopped jamming signals is shown in FIG. 2. Each block will be discussed in detail along with architecture options. Referring to FIG. 2, different line types (e.g., solid, dotted, etc.) are used to show different types of signals. Solid lines are used to show a single composite I-Q channel at some IF or RF carrier frequency. In one embodiment, the IF is a digital IF. When the processing is done on the individual I and Q channels, the signal path is shown in dotted and the dashed lines are control lines. The individual I and Q channels are not shown to avoid congestion in the drawing. As one skilled in the arts will recognize, the RF bandwidths, data rates and signal path delays in this example are for explanation only and do not limit the application of this invention to different RF bandwidths, data rates and delay times. In this example, the delay times of 0.1 msec are just examples. In applications, these delays, blocks 2009, 2024, 2032 are determined by the particular signal configurations and signal environments.

For the example discussion below, cellular signals are used for discussion. This architecture and the techniques described herein also apply to any frequency hopped signals such as military anti jam (AJ) signals.

A key here is the sampling of the full receive band to include the source signals that create the IMPs. The source signals are isolated and processed in a nonlinear model in the IMPs estimation model in block 2018. This nonlinear model takes one of two basic forms, a nonlinear channel model or a process in which the sources signals are multiplied together to create an estimate of the IMPs. The SOI processing path and the IMP estimation paths are delayed as required to allow time for the generation of the IMP cancellation signals and the phase and amplitude adjustments to improve the cancellation process.

Note that in the following discussion, the terms "block" and "unit" may be used interchangeably. Such blocks and units include processing logic that may comprise hardware (circuitry, dedicated logic, etc.), software (such as is run on a general purpose computer system or a dedicated machine), firmware, or a combination of the three.

Antenna: Block 2001

In one embodiment, the antenna receives the full passband of the allocated receive channel and the transmission path for the handset transmission. In GSM like systems, the communications channel is not full duplex and the transmission is not done simultaneously with the reception. In half duplex systems, an RF switch is used to alternate between transmit and receive channels. In CDMA and WCDMA systems, the handset operates in a full duplex operation and a duplexer is used to provide transmitter to receiver isolation. If the source signals for IMPs fall outside the receiver passband, the IMP cancellation process samples the environment prior duplexer 2002 to get copies of the source signals.

Duplexer: Block 2002

Duplexer 2002 is used in full duplex operation to provide attenuation of the transmitter feed thru to the receiver channel. In the PCS band, the paired transmitter and receiver channels are separated by 80 MHz and the transmitter signal is attenuated by around 50 to 55 dB by duplexer 2002. The transmitter power can be as high as 30 dBm and with 55 dB of attenuation the transmitter feed thru seen by the receive channel can be as high as −25 dBm. When there is a close in blocker, cross modulation can be experienced in the LNA. The specified blocker power level can be as high as −30 dBm. Due to the non-constant envelope on the transmitter feed thru, the cross modulation (which is a function of the IIP3 in the LNA) of the required IIP3 in LNA 2003 must be at least +7.6 dBm if there is no intermodulation suppression. The required sensitivity is −116 dBm for the SOI.

In one embodiment, duplexer 2002 also provides suppression of the out of band signals for the receive channel. In systems that do not operate in a full duplex mode, an RF SAW filter 2004 may be included prior to LNA 2003 to suppress out of band signals that would normally be eliminated by duplexer 2002. When SAW filter 2004 is used before LNA 2003, the IIP2 in LNA 2002 can create interference when high power signals self mixed and create a "close to DC" interfering signals.

LNA: Block 2003

LNA 2003 provides the initial amplification of the receive signal and the noise figure of this block is a key component of the system noise figure. The IIP2 and IIP3 of LNA 2003 can induce significant interference when high power blocker signals are present and create IMPs in band of the signal of interest.

RF SAW Filter: Block 2004

RF SAW filter 2004 is a fixed center frequency device with good out of band attenuation, typically on the order of 50 to 55 dB. For the PCS band, filter 2004 is 60 MHz wide. In the case of the PCS band, RF SAW filter 2004 passes the entire 60 MHz of the allocated receive band. The receiver receives the entire band because the channel to which the handset will be assigned is not known prior to entry into the cell. After the amplification by LNA 2003 and the filtering by RF SAW filter 2004, the specific channel selection is done as soon as possible either at IF or baseband. RF SAW filter 2004 further reduces the transmitter feed thru and provides additional out of band signal rejection.

Mixer: Block 2005

Mixer 2008, after the LNA 2003 and RF SAW filter 2004, down converts the signal to either and IF or baseband. The local oscillator (LO) used for the frequency down conversion process is tunable such that the assigned channel is converted to either a fixed IF or baseband where the channel selection filters are located. In one embodiment, Mixer 2005 is a nonlinear device and the IIP2 and IIP3 of mixer 2005 will contribute to the system IIP2 and IIP3. In one embodiment, Mixer 2005 also includes an AGC and buffer amplifiers which can also contribute to the system IIP2 and IIP3.

Since Mixer 2005 is after RF SAW filter 2004, the interfering source signal outside of the allocated receiver band are greatly attenuated. In one embodiment, the function is performed for both the I and Q channels.

Baseband Analog Filters: Block 2006

In a super heterodyne receiver, an IF SAW filter is used to perform the assigned channel selection. In a direct conversion system, analog baseband filters 2006 are used to provide some attenuation of the blocking signal and limitation of the noise bandwidth prior to the A/D converters 2007. The on chip analog filters 2006 will typically involve amplification as well as filtering and these are active filters. Active filters will have non-linear characteristics and the IIP2 and IIP3 will contribute to the system level IIP2 and IIP3. In one embodiment, this function is performed for both the I and Q channels Sigma Delta A/D Converter: Block 2007

In one embodiment, sigma delta A/D converter 2007 over samples the signal at 1 bit per sample with typically a second or third order loop and the signal of interest is isolated by decimating (SOI) filters 2008. Decimating filters 2008 can be of different bandwidths, thus providing a multi-mode capability. The A/D conversion is done at baseband to provide the optimal SNR since the QSNR of the SOI is inversely proportional to the highest frequency in the sampled signal. A higher the IF signal results in a lower QSNR and thus a lower effective number of bits. In one embodiment, the required number of bits is 13 to 14 bits and thus a SNR on the sampling process of 80 to 84 dB is used. In one embodiment, this function is performed for both the I and Q channels.

Signal of Interest (SOI) Decimating Filters: Block 2008

The over sampling of the sigma delta sampler is traded for SNR in the decimating filters. The varying bandwidths of the decimating filters 2008, in this block, provide the multi-mode capability. In one embodiment, this function is performed for both the I and Q channels.

Programmable Delay Buffer: Block 2009

Programmable delay buffer 2009 is a delay that delays the SOI for a short period of time so the frequency hopped jamming signals can be acquired and cancelled in cancelled block 2010. In one embodiment, Buffer 2009 is a first in and first out buffer and the amount of delay is adjustable depending on the nature of the frequency hopped or spurious IMPs. A one time difference between the SOI path, blocks 2001 to 2010 and the interference cancellation path 2013 to 2032 is a static delay. Once this delay is known, the phase and amplitude of the IMP estimate can be adjusted in a very short period of time. If required, this can be determined with timing calibration at power up. In one embodiment, the buffer 2009 provides a programmable delay and a steady output of the delayed signal of interest to interference cancellation block 2010 to provide a continuous cancellation of the interference with a system delay of about 100 microseconds. In one embodiment, this function is performed for both the I and Q channels. As one skilled in arts will recognize, the magnitude of the delay can be varied to adjust to the frequency hopping features without impact to the general nature and application of the techniques described herein.

Interference Cancellation Block: Block 2010

In one embodiment, interference cancellation block 2010 comprises digital adders in which the estimate of the interfering signal(s) IMPs are subtracted from the SOI to cancel the inband interfering signals, IMPs. The cancellation block will typically consist of several cancellation signals being subtracted simultaneously and the output from the block goes to the baseband processor and complex correlator 2029 which can determine the effectiveness of the cancellation process and can then provide fine tuning of the phase and amplitude of the estimate of the IMP. In one embodiment, this function is performed for both the I and Q channels.

Interference Cancellation Calibration Block: Block 2011

Blocks 2011 thru 2030 provide the process for the development of the interference cancellation signals. In these blocks, the estimate of the IMP is delayed in a parallel path to the calibration path blocks 2011, 2012 and 2020 thru 2022. When the phase and amplitude adjustment for the IMP estimate is determined, the offsets are passed to the delayed path to correct the phase and amplitude of the IMP estimated to be used to cancel the delayed copy of the SOI in blocks 2009 and 2010. Block 2011 takes a copy of the SOI digital signal prior to the programmable delay buffer 2009. Block 2011 provides digital cancellation of the interference with an estimate of the interfering signal. Complex correlator block 2012 provides control signals for the adjustment of the phase and amplitude of the IMP estimate to optimize the interference cancellation calibration process. In one embodiment, this function is performed for both the I and Q channels.

Complex Correlator: Block 2012

In one embodiment, Complex correlator 2012 receives two inputs, one from the cancellation block 2011 after the cancellation process and one from the IMP computation process after the phase and amplitude adjustment block and the I-Q decomposition and digital down conversion in Block 2023. Complex correlator 2012 first performs a correlation on the phase by correlating a 90 degree phase shifted copy of estimate and the post interference cancellation SOI from 2011. In one embodiment, the value of the correlation is minimized by adjusting the phase in blocks 2020 and 2021. These are discussed in detail below. When the correlation of the phase has been minimized, correlator 2012 correlates the estimate of the IMP from block 2023, without the 90 degree phase shift, with the post cancellation signal from 2011. The amplitude is then adjusted in block 2022 to help minimize the correlation process. In one embodiment, this function is performed for both the I and Q channels.

In one embodiment, the phase and amplitude and group delay of the IMP cancellation signal are adjusted in a FIR filter or an IIR filter. This provides a multitude of delays or a plethora of delays as required to adjust the phase and amplitude of the cancellation signal to optimize the cancellation process.

Flash A/D Converter: Block 2013

The receive signal is sampled at the output of LNA 2003, or after the RF SAW filter, 2004. If the transmitter feed thru is to be acquired via this path, then the signal is sampled at the output of LNA 2003. An alternate method is to get a sample of the transmit signal from the transmitter and use this signal to compute the estimate of the cross modulation interference. In one embodiment, if the transmit feed thru is recovered directly from transmit channel, the output is taken the output of RF SAW filter 2004 which provides the function of an anti-aliasing filter which limits the sampled signal to 60 MHz passband. In this case, the flash A/D 2013 samples the signal on the order of 150 MHz. As one skilled in the arts will recognize, the passbands of the signal sets and the A/D converters 2013 will be implementation specific and do not detract from the general capability and application of the techniques described herein.

In one embodiment, if the transmitter feed thru is recovered from the receive chain, the passband is 140 MHz because it covers the entire transmit and receive bands. In the case of CDMA2000 and other full duplex systems, the signal of interest in the handset transmit band is the transmit feed thru from that handset. All other signals will be significantly attenuated by free space loss and duplexer 2002. As one skilled in the arts will recognize, the passbands of the signal sets and A/D converters 2013 will be implementation specific and do not detract from the general capability and application of the techniques described herein.

In one embodiment, flash A/D converter 2013 is a 4 bit A/D converter. If the interference cancellation process is accurate to 3 or 4 bits, the interference cancellation will be 18 to 24 dB at 6 dB per bit. As one skilled in the arts will recognize, the A/D resolutions given here are for illustration purposes and differences in the A/D resolution do not detract from the general capability and application of the techniques described herein. If, for any reason, more resolution is required, the analog value is down converted to some convenient IF and the pass band is then sampled by A/D converter 2013 with more bits of resolution. The source signals are recovered with decimating filters and this increases the QSNR and the effective number of bits.

If the transmitter feed thru is recovered from the receive path, the flash A/D converter 2013 samples the passband at 300 MHz. The output of the A/D converter 2013 goes to filter blocks 2014 and 2030. Blocks 2030 thru 2032 process the transmitter feed thru. Filter 2014 is the input to the $2^{nd}$ and $3^{rd}$ order IMP estimate generation. As one skilled in the arts will recognize, the passbands of the signal sets and the A/D converters will be implementation specific and do not detract from the general capability and application of the techniques described herein.

This is discussed in detail below. In one embodiment, this process in done on a single composite signal and not on the I and Q channels. As one skilled in the arts will recognize, the processing of the signals as passband signals or the processing of the signals at complex I-Q baseband does not detract from general capability or application of the techniques described herein.

Receive Band Decimating Filter: Block 2014

Filter 2014 takes the 300 MHz 4-bit digital sample and the signal is filtered to pass just the 60 MHz receive pass band and the signal is down sampled to 150 MHz 4-bit samples for further processing. The 150 mega samples per second are sent to blocks 2015 and 2016. This is discussed in detail below. In the case where either the transmit feed thru is not an issue, such as in systems that are not full duplex, and systems where in the transmitter signal is acquired by sampling the output of transmitter output filter 2014 is not required.

In one embodiment, this process in done on a single composite signal and not on the I and Q channels. As one skilled in the arts will recognize, the A/D resolutions and the analog passbands given here are for illustration purposes and differences in the A/D resolution do not detract from the general capability and application of the techniques described herein.

Programmable Buffer: Block 2015

The search process in block 2016 introduces a finite delay that determines how fast the source signals can be identified. The delay in programmable buffer block 2015 provides a delay equal to the time required for the search process to find the source signals in the receive band. By delaying a copy of the sampled signal until the frequency locations of the source signals can be identified, the frequency hopped source signals, and thus the frequency hopped IMPs, can be processed in near real-time and the interfering signal can be cancelled as they come up, and very little if any residual interference will be experienced by the SOI. If the initial 5 microseconds of the interference can be accepted, then programmable buffer 2015 may not be required. The output of the delay buffer is sent to decimating filtering 2017 where the source signals are isolated and the digital sample rate is reduced to 10 MHz. In one embodiment, this is discussed in detail below.

In one embodiment, this process is done on a single composite signal and not on the I and Q channels. As one skilled in the arts will recognize, the A/D resolutions and the analog passbands given here are for illustration purposes and differences in the A/D resolution do not detract from the general capability and application of the techniques described herein. This also applies to the signal delay paths.

Source Signal Search Algorithm; Block 2016

In one embodiment, the receive pass band of 60 MHz is sampled at 4 bits and 150 MS/s. A 128 Point FFT is computed to get a frequency resolution of about 470 kHz. In one embodiment, the FFT requires 448 complex multiplications and 896 complex additions. This results in 1792 4-bit multiplies and 1972 4-bit additions The time to collect sufficient samples at 470 MHz is approximately 2 to 3 microseconds. The speed of the 4 bit 128 point FFT computation can be made very fast by performing parallel computation. If the 128 point FFT requires 64 parallel butterflies, this results in each path computing 3583/64 operations (4 bit multiplications and additions), which results in 56 operations in each path. If a clock rate of 50 MHz is used, the delay is approximately 1 to 2 microseconds. The number of gates and the clock rate can be traded off in the final implementation. As one skilled in the arts will recognize, the A/D resolutions and the analog passbands given here are for illustration purposes and differences in the A/D resolution do not detract from the general capability and application of the techniques described herein. This also applies to the resolution on the FFTs or other passband search algorithms.

When the FFT has been computed, the 128 components are evaluated and those components with sufficient amplitude are processed to determine which ones have the required frequency spacing to produce an IMP in band of the SOI. When a pair of source signals that will result in an inband IMP are identified, the frequencies are passed in control signals to the decimating filters in filter block 2017.

In one embodiment, the band is re-searched every 5 microseconds and the search algorithm selects the worse case interfering signals. The process can process multiple interfering signals simultaneously. In the case of processing multiple interfering signals simultaneously, the search algorithm process passes control signals to multiple copies of block 2017. As one skilled in the arts will recognize, the time frame for researching the passband is application dependent and variations in the timeframes do not detract from the general capabilities and applications of the techniques described herein.

In the case of signals that have sufficient amplitude to create $2^{nd}$ order products with enough power to interfere with the SOI, the single signal is isolated with a single decimating filter. The only difference between the processing downstream of a $2^{nd}$ and a $3^{rd}$ order IMP processing path is that the $2^{nd}$ order IMP estimate is generated by simply multiplying a signal by itself or squaring the samples. This can also be done by passing the signal through a nonlinear model of the compression curve for the nonlinearity.

In one embodiment, the decimating filters 2017 will also isolate any blocking signal close enough to the SOI for the transmitter feed thru to generate cross modulation products in the SOI. The output of decimating filter block 2017 is sent to the IMP estimation generation block 2018 and the cross modulation processing block 2032. This process in done on a single composite signal and not on the I and Q channels.

Decimation Filters: Block 2017

The search algorithm identifies the FFT components that have sufficient energy and the required frequency spacing to product inband SOI $2^{nd}$ and $3^{rd}$ order IMPs interfering signals. These control signals are used to determine the center frequency for the programmable decimating filters 2017. The bandwidth of decimating filters 2017 is on the order of 450 kHz and these are filters with a few poles, typically on the order of 3 or 4 poles. The generation of the IMP estimates that follow require a high fidelity time domain copy of the source signals and so the filtering in the frequency domain is benign. As one skilled in the arts will recognize, the process of passing one or more signals through the model of a nonlinearity can be extended to multiple signals to generate higher order IMPs, or the multiple signals can be multiplied by each other in different combinations to generate higher order IMPs. The multiplication of multiple signals together is another instantiation of a nonlinear model.

In one embodiment, the output to IMP estimate generation block 2018 is either one or two signals at 10 MHz 4-bit samples with a bandwidth of approximately 450 to 480 MHz. There are two signals for $3^{rd}$ order IMP processing and one for $2^{nd}$ order IMP processing. As one skilled in the arts will recognize, the process of passing one or more signals through the model of a nonlinearity can be extended to multiple signals to generate higher order IMPs, or the multiple signals can be multiplied by each other in different combinations to generate higher order IMPs. The multiplication of multiple signals together is another instantiation of a nonlinear model.

This process is performed by filters 2017 in done on a single composite signal or on the individual I and Q channels and it is done at some digital IF which will then be decomposed into I and Q and digitally down converted to baseband or zero IF in a downstream process.

Decimating filters 2017 increase the QSNR of the source signal samples by the ratio of the reduction in bandwidth. This increases the effective number of bits and improves the accuracy and magnitude of the cancellation process.

IMP Estimate Generation: Block 2018

The source signals that have been isolated in decimating filter block 2017 are input to IMP estimate generation 2018. In the case of the $3^{rd}$ order IMP estimates, the two signals from decimating filter block 2017 are multiplied together samples by sample with one value being multiplied twice as required to generate the appropriate $3^{rd}$ order IMP. The $3^{rd}$ order components that fall outside of SOI will be filtered out in the SOI filter block 2019. As one skilled in the arts will recognize, the process of passing one or more signals through the model of a nonlinearity can be extended to multiple signals to generate higher order IMPs, or the multiple signals can be multiplied by each other in different combinations to generate higher order IMPs. The multiplication of multiple signals together is another instantiation of a nonlinear model.

In one embodiment, the sum (composite of the source signals) is convolved with the mathematical model of the amplifier or nonlinear channel to effectively multiply the signals together and create the estimate of the IMPs cancellation signal(s).

In the case of the $2^{nd}$ order IMPs, if a signal has sufficient power to create a significant $2^{nd}$ order IMP at baseband, the signal is isolated in the decimating filters in decimating filter block 2017 and the signal is squared, sample by sample, to generate the $2^{nd}$ order IMP. Any components that fall outside SOI are filtered out in SOI filter 2019.

In one embodiment, the IMP estimate is generated from copies of the real time source signals that generate the IMPs that are inband of the SOI. When one or more of the source signals go away, the cancellation signals also goes away because one of the signals that is multiplied to get the estimate goes to zero, and when one number is multiplied by zero the cancellation signal is zero.

This process in done on a single composite signal and or on the individual I and Q channels or it is done at some digital IF which will then be decomposed into I and Q and digitally down converted to baseband or zero IF in a downstream process.

SOI Filter: Block 1019

When the IMP estimate block multiplies the time samples of the source signals together, there will be components generated that do not fall into the band of the SOI. The SOI filter block performs filtering of IMP components that do not fall in the band of the SOI.

This process in done on a single composite signal and not on the individual I and Q channels and it is done at some digital IF which will then be decomposed into I and Q and digitally down converted to baseband or zero IF in a downstream process.

Calibration Macro Phase Adjustment: Block 2020

The estimate of the IMP may not have the same delay as seen in the SOI path. The macro delay is a first-in first-out buffer that provides full sample delays. In one embodiment, the time delay is a phase shift. When more actuate phase adjustment is required, this is accomplished in the micro linear phase adjustment in block 2021. Macro phase adjustment block 2020 receives control signal from correlator. Complex correlator 2012 which computes the correlation between the SOI after the cancellation process and the cancellation IMP signal. In one embodiment, complex correlator 2012 uses a dither or similar type algorithm to adjust the phase delay to minimize the cross correlation. It may use a FIR filter with a minimization algorithm.

The value of the phase adjustment is sent continually to macro phase adjustment block 2025 which provides the correction to the delayed IMP estimate from programmable buffer 2024 to align it in time with the delayed copy of the signal of interest in programmable buffer 2009.

This process in done on a single composite signal or on the individual I and Q channels or it is done at some digital IF which will then be decomposed into I and Q and digitally down converted to baseband or zero IF in a downstream process.

Calibration Micro Phase Adjustment: Block 2021

When the sampled signal is over sampled from a Nyquist point of view, full symbol delays can result in very large phase shifts on the order of 45 to 90 degrees. In this case, the phase shift may not be of sufficient resolution to align the estimate of the IMP to cancel the interference in the SOI. In this case, a weighted average of the consecutive symbols is computed and the new value is mapped in time to the time slot for another original symbol. This can be viewed as a small FIR filter with two or more taps. Micro phase adjustment block 2021 receives a control signal from correlator 2012 which computes the correlation between the SOI after the cancellation process and the cancellation IMP signal. In one embodiment, correlator 2012 uses a dither or similar type algorithm to adjust the phase delay to minimize the cross correlation.

The value of the phase adjustment is sent continually to micro phase adjustment block 2026, which provides the correction to the delayed IMP estimate from macro phase adjustment block 2025 to align it in time with the delayed copy of the signal of interest in programmable buffer 2009.

This process in done on a single composite signal and or on the individual I and Q channels or it is done at some digital IF which will then be decomposed into I and Q and digitally down converted to baseband or zero IF in a downstream process.

Calibration Amplitude Adjustment: Block 2022

There is a possibility that the amplitude of the IMP estimate may not have the correct amplitude to correctly and completely cancel the interference. Amplitude adjustment block 2022 provides the ability to adjust amplitude of the IMP estimate under the control of the complex correlator 2012. Amplitude adjustment block 2022 receives control signal from the complex correlator 2012 which computes the correlation between the SOI after the cancellation process and the cancellation IMP signal. In one embodiment, complex correlator 2012 uses a dither or similar type algorithm to adjust the phase delay to minimize the cross correlation. In one embodiment, the phase and amplitude are adjusted with a FIR filter providing a multitude of plethora of time delays In one embodiment, the value of the phase adjustment is sent continually to Amplitude adjustment block 2027, which provides the correction to the delayed IMP estimate from micro phase adjustment block 2026 to align it in time with the delayed copy of the signal of interest in programmable buffer 2009.

This process in done on a single composite signal and/or on the individual I and Q channels or it is done at some digital IF which will then be decomposed into I and Q and digitally down converted to baseband or zero IF in a downstream process.

Calibration I and Q Decomposition & Digital Down Conversion: Block 2023

Up to this point in the process, the IMP estimate generation process has been conducted on an I-Q composite signal at a digital IF frequency. In this block, a digital down conversion to digital baseband I and Q is done and the phase alignment of the I-Q down conversion is done under the control of complex correlator 2012. The I and Q components of the IMP estimate are sent to complex correlator 2012 and to interference cancellation calibration block 2011. Complex correlator 2012 adjusts the phase of the I and Q complex down conversion to optimize the interference cancellation process.

The control output of block 2023 is sent continuously to block 2028 which uses the same phase offsets to perform the complex down conversion to the baseband I and Q.

Buffer for IMP Estimate: Block 2024

Programmable buffer 2024 provides up to 100 microseconds of delay for the 4-bit IMP estimate. This programmable buffer is used to adjust the time delay of the IMP cancellation signal with the SOI delay in programmable buffer 2009. This buffer delay is controlled by the complex correlator 2029. As one skilled in the arts will recognize, the magnitude of delay and number of bits a quantization is an example here and does not detract from the general nature, capabilities and applications of this invention. Each instantiation will be signal path dependent.

This process in done on a single composite signal or on the individual I and Q channels or it is done at some digital IF which will then be decomposed into I and Q and digitally down converted to baseband or zero IF in a downstream process.

Delayed IMP Estimate Macro Phase Delay: Block 2025

The macro delay or full sample delay is performed with a first-in and first-out buffer. The macro level delay calibration has been computed calibration loop in the macro phase adjustment block 2020. The delay offset is continuously received from macro phase adjustment block 2020 and is used to delay the IMP estimate from programmable buffer 2024. In one embodiment, this delay allows for the cancellation process to process the IMP estimate with a delay of 100 microseconds which is the time required to calibrate the IMP cancellation process so that there is no loss in the cancellation process when frequency hopping interfering signal come and go. As one skilled in the arts will recognize, the magnitude of delay and number of bits a quantization is an example here and does not detract from the general nature, capabilities and applications of this invention. Each instantiation will be signal path dependent.

This process in done on a single composite signal or on the individual I and Q channels or it is done at some digital IF which will then be decomposed into I and Q and digitally down converted to baseband or zero IF in a downstream process.

Delayed IMP Estimate Macro Phase Delay: Block 2026

The micro delay or sub sample delay is performed in an interpolation fashion as discussed in micro phase adjustment block 2021. The micro level delay calibration has been computed in a calibration loop in micro phase adjustment block 2021. The delay offset is continuously received from 2021 and is used to phase shift the IMP estimate from programmable buffer 2024 after 2025. This phase adjustment allows for the cancellation process to process the IMP estimate with a delay of 100 microseconds which is the time required to calibrate the IMP cancellation process so that there is no loss in the cancellation process when frequency hopping interfering signal come and go. As one skilled in the arts will recognize, the magnitude of delay and number of bits of quantization is an example here and does not detract from the general nature, capabilities and applications of this invention. Each instantiation will be signal path dependent.

This process in done on a single composite signal or on the individual I and Q channels or it is done at some digital IF which will then be decomposed into I and Q and digitally down converted to baseband or zero IF in a downstream process.

Delayed IMP Estimate Amplitude Adjustment: Block 2027

The amplitude adjustment is performed in 2027. The amplitude calibration has been computed in calibration loop in amplitude adjustment block 2022. The amplitude correction is continuously received from 2022 and is used to adjust the amplitude of the IMP estimate from the programmable buffer 2024 thru 2026. This amplitude adjustment allows for the cancellation process to process the IMP estimate with a delay of 100 microseconds which is the time required to calibrate the IMP cancellation process so that there is no loss in the cancellation process when frequency hopping interfering signal come and go. As one skilled in the arts will recognize, the magnitude of delay and number of bits of quantization are examples here and does not detract from the general nature, capabilities and applications of this invention. Each instantiation will be signal path dependent.

This process in done on a single composite signal or on the individual I and Q channels or it is done at some digital IF which will then be decomposed into I and Q and digitally down converted to baseband or zero IF in a downstream process.

Delayed IMP Estimate I & Q Decomposition & Down Conversion: Block 2028

Block 2028 continuously receives the I-Q phase rotation control from Block 2023 to down convert the estimate of the IMP coherently with the SOI buffered in programmable buffer 2009. Block 2028 outputs the I and Q values of the IMP cancellation signals to block 2010 for cancellation of the interfering inband IMPs.

SOI and IMP Estimate Complex Correlator: Block 2029

Complex correlator 2029 provides the final calibration and quality control check on the interference cancellation process. Complex correlator 2029 operates in the same may described above with respect to complex correlator 2012. If there are any adjustments required to optimize the process, they will be identified here and fine adjustment can be made via control to blocks 2024 thru 2028. FIG. 2 shows the top level block diagram, and the full implementation this function is performed for both the I and Q channels.

Transmitter Feed Thru Decimating Filter: Block 2030

The frequency of the transmit signal is known and is readily extracted from the 4-bit per sample of the signal at the output of the LNA by the programmable decimating filter in 2030. The 300 MHz 4-bit signal is filtered in filter 2030 and the sample rate is reduced to 10 MHz 4-bit samples. The required copy of the transmitter signal can be acquired by sampling the transmit signal at the output of the high power amplifier (HPA) and sampling it with a low speed 10 MHz A/D, and if this is done, the sampled signal in 2013 is taken after the RF SAW filter and is sampled at 150 MHz at 4 bits. As one skilled in the arts will recognize, the band passes of the signals, the number of bits of quantization and delays are application dependent and this example in not intended to limit the scope, applications or functions of this invention.

This process in done on a single composite signal or on the individual I and Q channels or it is done at some digital IF which will then be decomposed into I and Q and digitally down converted to baseband or zero IF in a downstream process.

Cross Modulation Processing: Block 2031

If the application of the techniques described herein is not a full duplex system, or if there is no close in blocker to create cross modulation, the cross modulation processing stream can be used to cancel another $2^{nd}$ or $3^{rd}$ order IMP. This applies to blocks 2031 thru 2034.

The cross modulation interference results when a high power interfering or blocking signal is within the bandwidth of the transmit signal from the band edge of the receive signal. When a high energy signal is encounter in the search block 2016, the decimating filters 2017 will isolate this signal and send the signal to the Cross modulation processing block 2031. Cross modulation processing block 2031 performs the same functions as the blocks 2018 and 2019. With the two signals that create the cross modulation interference, namely the transmitter feed thru and the close in blocker, an estimate of the cross modulation interference is created. This process in done on a single composite signal or on the individual I and Q channels or it is done at some digital IF which will then be decomposed into I and Q and digitally down converted to baseband or zero IF in a downstream process.

Cross Modulation Programmable Delay Buffer: Block 2032

Programmable delay buffer 2032 performs the same function as programmable buffer 2024.

This process in done on a single composite signal or on the individual I and Q channels or it is done at some digital IF which will then be decomposed into I and Q and digitally down converted to baseband or zero IF in a downstream process.

Cross Modulation Phase and Amplitude Adjustment: Block 2033

The phase and amplitude adjustment block 2033 performs the same functions at 2020 thru 2022 and 2025 thru 2027.

This process in done on a single composite signal and not on the individual I and Q channels and it is done at some digital IF which will then be decomposed into I and Q and digitally down converted to baseband or zero IF in a downstream process.

Cross Modulation I & Q Down Conversion to Baseband: Block 2034

Decomposition block 2034 performs the same functions as described in decomposition block 2028. At the output of 2034, the I and Q signals are sent to a complex correlator like complex correlator 2029 as well as to the cancellation block 2010.

System Timing and Delay

Figure 3:
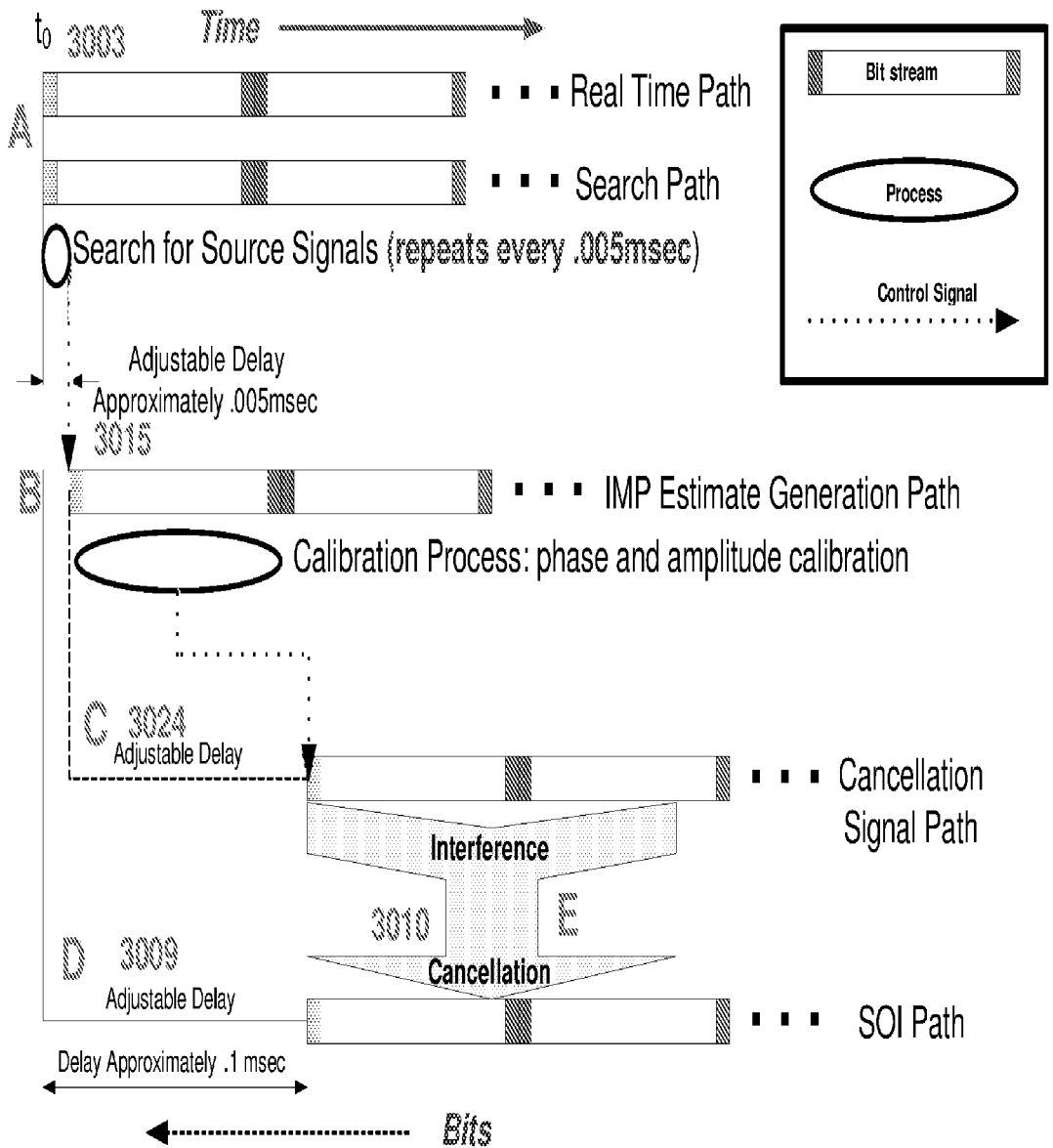
FIG. 3 is an example timeline for IMP cancellation with frequency hopped signals.

FIG. 3 shows the system timing and delay provided by the architecture shown in FIG. 3. Point A in FIG. 3 corresponds to LNA 2003 in FIG. 2. At the output of LNA 2003, the SOI processing path and the IMP estimate generation path have zero delay. The total delay in the IMP processing path and the SOI path must be matched.

The IMP processing path has a 0.005 msec delay at Point B which corresponds to programmable buffer 2015 and which provides the capability to set up the decimating filters 2017 so as to capture the entire interfering source signals. The delay corresponds to the search window.

Point C in FIG. 3 corresponds to programmable buffer 2024 in FIG. 2, which is a programmable delay used to adjust the delay between the SOI path and the IMP Cancellation Path.

Point D in FIG. 3 corresponds to programmable buffer 2009 in FIG. 2, which is a programmable delay used to adjust the delay between the IMP Cancellation Path and the SOI path.

Point E in FIG. 3 corresponds to cancellation block 2010 in FIG. 2 where the time delayed SOI and the IMP cancellation signals are summed together to cancel the interference in the SOI. The 100 microsecond delay provides the capability to find the source signals that can produce inband IMPs and cancel them for all source signals including frequency hopped signals. As one skilled in the arts will recognize, the delay is dictated by the hopping rate for frequency hopped signals and is application dependent and does not detract from the general nature, capability and application of the techniques described herein.

Frequency Hopped Narrowband Signals Interfering with 802.11b/g, WiFi, in the ISM Band The mitigation of narrowband interfering signal on wideband spread spectrum (802.11b) and OFDM (802.11g) involves quickly finding the interfering signal, recovering a copy of the interfering signal and subtracting the narrowband interfering signal from the SOI. When this is done, the portion of the SOI that is within the bandpass of the narrowband interfering signal will be lost. If the bandwidth of the interfering signal is small compared to the SOI, the degradation in the SOI will be small. As an example, if a 22 MHz wide 802.11b signal has interference from a BT signal, the BT signal is 1 MHz wide and ½₂ of the 802.11b energy is lost. This will result in a SNR degradation of 0.2 dB and this will be for a very short period of time. This same principle applies for any signal that is narrowband compared to the SOI to include microwave ovens. The system tradeoff is the impact of the interference versus the SNR after interference cancellation which is equal to the ratio of the bandwidths. The impact of WiFi on the BT signal is not considered to be a serious problem when they are not co-located. This SNR in not suffered when the WiFi (802.11b,g) and the BT are collocated in a single computer as discussed below.

The ISM band is an unlicensed band which is shared by many applications including Bluetooth (BT) which is frequency hopped in a pseudo random fashion. When the BT is collocated with the WiFi, the BT and WiFi transmission signals that produce the BT and WiFi receiver interference are readily available and are used to cancel the WiFi from the BT and the BT from the WiFi. In the case of BT interference on WiFi from sources that are not collocated, a different approach is used.

Figure 4:
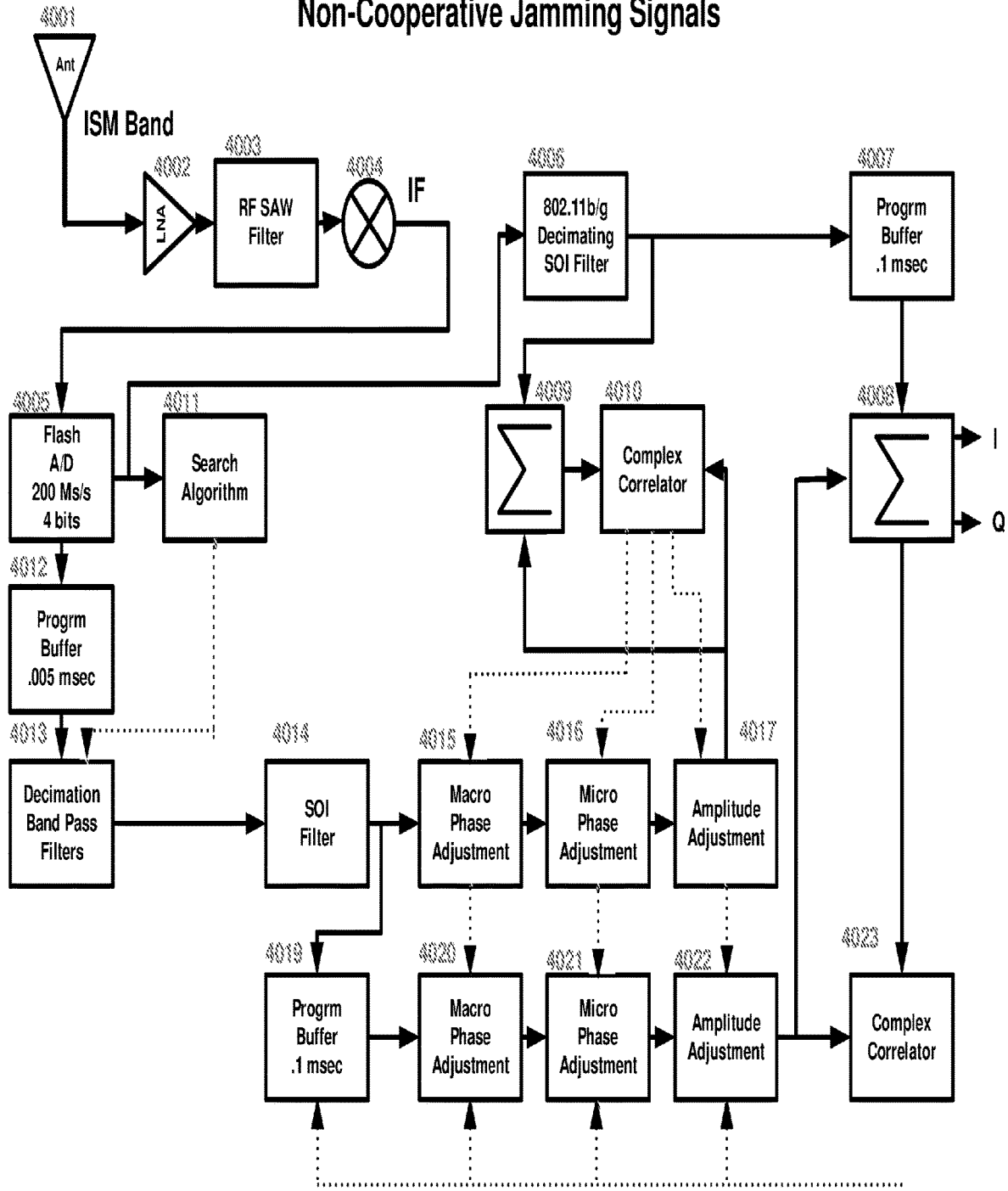
FIG. 4 illustrates 802.11b/g interference cancellation with frequency hopped signal, with non-cooperative jamming signals.

When mitigating the interference from non-collocated BT interference, the same delay technique described for the telephony above is used. The top level architecture diagram is shown in FIG. 4. In this architecture, all processing is done on the composite IQ signal at an IF frequency either digitally or in analog. After all interference mitigation has been performed, the signal is converted to I-Q format with a complex down conversion in the digital domain. This is done as part of the cancellation block 4008 which outputs the baseband digital I and Q.

While there can be a number of different interfering signals in the ISM band, the focus here will be on frequency hopped interfering signals because continuous or near continuous interfering signals can be handled by the same architecture or a subset thereof.

The key frequency hopped interfering signal will be BT which is hopped over 79 frequencies of the ISM band at 1600 times per second in a pseudo random manner. Due to the pseudo random nature and short duration of the hops, the cancellation process will induce a 100 microsecond delay to find the interfering signal and isolate it with a programmable decimating filter as was done for the telephony. In this case, however, the source signal is the interfering signal and it can be used directly to cancel the interference. The search algorithm is a little bit different in that the components of the FFT are analyzed to find those that exceed the average by some to be determined value. This will be discussed in detail below.

Antenna: Block 4001

The antenna receives the full ISM band. For WiFi and BT, a duplexer is not required since the systems are not full duplex. For WiFi, there are 22 MHz, (802.11b) and 20 MHz (802.11g) bands within the 84.5 MHz ISM band. There may be interfering signals such as microwave ovens, cordless phones and BT signals also in the band which is unlicensed and anyone can use it if they stay within specified power levels. The antenna will pass the signal of interest and all interfering signals in the ISM band.

Low Noise Amplifier LNA: 4002

LAN 4002 provides the initial amplification of the ISM band received from the antenna. IMPs are not typically the problem in WiFi because the ISM band does not have high power transmitter base stations as seen in cellular telephony systems. Users of the ISM however do see a considerable amount of co-channel interference, i.e. signals in the same frequency channels. If the IIP2 and IIP3 do present a problem, they will be handled in the same manner as described above. In some architectures, RF SAW filter 4003 may be placed prior to the LNA 4002 if there are high power signals outside the ISM band that could produce $2^{nd}$ or $3^{rd}$ IMPs within the ISM band. There will be a higher insertion loss in this type of architecture and the system noise figure will be higher.

RF SAW Filter: Block 4003

In one embodiment, RF SAW filter 4003 is an 84.5 MHz filter that filters out of band signals and reduces the noise band width of the signal prior to input to mixer 4004.

Down Conversion Mixer: Block 4004

Mixer 4004 may contain an AGC and buffer amplifiers prior to mixer 4004, but they are not shown here for simplification. This architecture is single conversion architecture as opposed to a direct conversion architecture as shown for the telephony applications. In this architecture, the ISM band is down converted to some lower IF, possibly has low as 50 MHz. Any convenient IF can be used. The lower the IF, the higher will be the SNR of the sampled signal. The Nyquist sampling of the WiFi signal is 44 MHz. If A/D converter 4005 samples the passband at 200 MHz, decimating filters 4006 will result in a 200/44 gain in SNR or a factor of about 4.6, which is about 6.5 dB which will result in one more effective bit over the sampling resolution. 802.11g requires about 50 dB of instantaneous dynamic range, so the A/D converter for this application will sample at 8 bits and the decimating filter will result in a SNR of 55 dB or 9+ effective bits. If the application is only to be used for 802.11g, but only 802.11g, the resolution of the A/D can be reduced to about 4 bits. In one embodiment, the selection of the IF is that it should be at or below 500 MHz to get a good SNR on the A/D conversion.

Flash A/D Converter: Block 4005

As discussed above, the ISM band is down converted to an Intermediate Frequency (IF) so that the phase noise on the sampling clock does not degrade the SNR to below required levels. An IF frequency below 500 MHz will be adequate. Depending on the resolution required, Flash A/D converter 4005 will sample the passband at 4 to 8 bits at 200 MHz. The subsampling results in images of the ISM every 200 MHz and the desired IF is digitally selected. The output of the A/D goes to three blocks simultaneously, namely 4006, 4011 and 4012.

802.11b/g Decimating Filters: Block 4006

The digital samples are filtered by a programmable decimating filter 4006. This does the SOI channel selection for either the 802.11b (22 MHz) or the 802.11g (20 MHz) and increases the bit resolution by 1 bit. In one embodiment, the sample rate is around 50 MHz at the output of filter 4006.

Blocks 4007 thru 4010

These block operate in the same manner as those described for blocks 2009 thru 2012 only here the processing in done on the composite I-Q Signal at a digital IF and not on the I and Q channels individually.

Search Algorithm

The search algorithm computes a 128 point FFT. It takes 2 to 3 microseconds to collect the required snapshot of samples to compute the FFT which provides a frequency resolution of 84.5/128=0.66 MHz. Using 64 parallel paths at 50 MHz, it takes 1 microsecond to compute the FFT as described for Block 2016. In this search algorithm, the values of the FFT are compared to the average value, and narrowband jammers that exceed a given threshold determine where the programmable decimation filters will isolate the high power narrowband signals. Block 4012 delays the samples from A/D converter and search Block 4011 sends control signals to decimation filter 4012 to set the filters to isolate the interfering signals from the BT or the other high power interfering signals.

Programmable Buffer: Block 4012

Programmable buffer 4012 works like programmable buffer 2015 described in FIG. 2. If the first 5 microseconds or so of the interference can be tolerated, block 4012 can be eliminated.

Decimation Filter: Block 4013

Decimation filters 4013 work like the filters in decimation filter 2017. The difference here between the telephony and the WiFi applications is that the signals isolated by decimation filters 4013 are the cancellation signals.

Calibration and Cancellation of Interference: Blocks: 4014 thru 4023

The calibration and cancellation of interference operate basically the same way as the corresponding functions in the telephony. The difference here is that all of the processing is done at a digital IF on a composite I-Q signal and the decomposition to I and Q and final down conversion to baseband is done digitally in block 4008.

In a first example embodiment, a method comprises acquiring copies of source signals that create IMPs in a passband of interest; creating copies of the IMPs for use as IMP cancellation signals by either multiplying the source signals together as a series of digital samples such that the multiplied signals create a near real and continuous time copy of the IMPs or creating a sum of the source signals in near real and continuous time and convolving the sum of the source signals with a mathematical model to effectively multiply the signals together to create a copy of the IMPs; adjusting one or both of phase and amplitude of the copies; and using the copies to cancel the IMPS inband of the passband of interest.

In another example embodiment, the subject matter of the first example embodiment can optionally include adjusting group delay of one or more IMP cancellation signals, and wherein adjusting the phase and amplitude and group delay occurs with a finite impulse response filter (FIR) or an infinite impulse response (IIR) filter.

In another example embodiment, the subject matter of the first example embodiment can optionally include that the IMPs are created by frequency hopped source signals, and further comprising tracking the frequency hopped generated IMPs using time buffering.

In another example embodiment, the subject matter of the first example embodiment can optionally include cross correlating an output of a IMP cancellation process with the IMP cancellation signal and then adjusting one or more of amplitude, phase and group delay of the IMP cancellation signal to reduce cross correlation.

In another example embodiment, the subject matter of the first example embodiment can optionally include that the source signals are frequency hopped signals, and further comprising processing the passband of the frequency hopped signals and creating an IMP cancellation signal that is either frequency hopped or continuous.

In another example embodiment, the subject matter of the first example embodiment can optionally include sampling a full passband to acquire the source signals, the source signals creating IMPS in the passband of interest in a receiver.

In another example embodiment, the subject matter of the first example embodiment can optionally include that the copies of the source signals are available from a co-located transmitter and copies of the source signals are sent to a receiver and the IMP cancellation signals are generated in the receiver and passive and active IMPs are cancelled in the receiver.

In another example embodiment, the subject matter of the first example embodiment can optionally include that source signals are acquired by either or both sampling or from a co-located transmitter.

In another example embodiment, the subject matter of the first example embodiment can optionally include that the source signals are delayed an amount of time to allow for frequency hopped source signals to be identified and isolated to create the IMP cancellation signals.

In another example embodiment, the subject matter of the first example embodiment can optionally include filtering at least one of the IMP cancellation signals, using a filter similar to a filter used on the source signals, to pass only IMP components that will fall inband of the passband.

In another example embodiment, the subject matter of the first example embodiment can optionally include that using the copies to cancel the IMPs inband of the passband of interest causes multiple IMPs to be cancelled simultaneously by a parallel process with one IMP cancellation per process.

In another example embodiment, the subject matter of the first example embodiment can optionally include that using the copies to cancel the IMPs inband of the passband of interest causes multiple IMPs to be cancelled simultaneously as a composite IMP signal of one or more IMPs, where the composite IMP cancellation signal set is generated by convolving the sum of the source signals with a mathematical model of a channel for active and or passive IMPs.

In another example embodiment, the subject matter of the first example embodiment can optionally include that each of the IMP cancellation signals becomes zero when one or more of the source signals is no longer present and only one source signal is left.

In another example embodiment, the subject matter of the first example embodiment can optionally include scanning source signals to determine when the IMPs are no longer present, and stopping the cancellation process so as not to inject noise as part of IMP cancellation.

In another example embodiment, the subject matter of the first example embodiment can optionally include that a passband of source signals is continuous, frequency hopped and spurious and is sampled and treated as a single source signal that is multiplied by other source signals to create a single or multiple IMPs cancellation signal set.

In another example embodiment, the subject matter of the first example embodiment can optionally include that a passband of source signals is continuous, frequency hopped and spurious and is sampled and treated as a single source signal that is convoluted with a mathematical model of an amplifier or a nonlinear channel to effectively multiply the signals together to create an IMP cancellation signal set used to cancel IMPs in the passband of interest. In another example embodiment, the subject matter of this example embodiment can optionally include filtering the IMP cancellation signals, with a filter similar to a filter used on the source signals, to pass only IMP cancellation frequency components that fall inband of the passband of interest.

In another example embodiment, the subject matter of the first example embodiment can optionally include that creating a copy of the cross modulation IMP signal using a transmitter feed through to cancel cross modulation IMPs in the passband. In another example embodiment, the subject matter of this example embodiment can optionally include filtering the cross modulation IMPs, with a filter similar to a filter used on the source signals, to pass only those IMP frequency components that fall within the passband.

In a second example embodiment, an apparatus comprises an input to acquire copies of source signals that create IMPs in a passband of interest; a first processing path to create copies of the IMPs for use as IMP cancellation signals by either multiplying the source signals together as a series of digital samples such that the multiplied signals create a near real and continuous time copy of the IMPs or creating a sum of the source signals in near real and continuous time and convolving the sum of the source signals with a mathematical model to effectively multiply the signals together to create a copy of the IMPs; an amplitude adjustment unit operable to adjust one or both of phase and amplitude of the copies; and a cancellation unit operable to use the copies to cancel the IMPs inband of the passband of interest.

In another example embodiment, the subject matter of the second example embodiment can optionally include a finite impulse response filter (FIR) or an infinite impulse response (IIR) filter operable to adjust group delay of one or more IMP cancellation signals.

In another example embodiment, the subject matter of the second example embodiment can optionally include that the IMPs are created by frequency hopped source signals, and further comprising a buffer to track the frequency hopped generated IMPs using time buffering.

In another example embodiment, the subject matter of the second example embodiment can optionally include a cross correlator to perform cross correlating on an output of an IMP cancellation process with the IMP cancellation signal; and an adjustment unit to adjust one or more of amplitude, phase and group delay of the IMP cancellation signal to reduce cross correlation.

In another example embodiment, the subject matter of the second example embodiment can optionally include that the source signals are frequency hopped signals, and further wherein the processing path is operable to process the passband of the frequency hopped signals and create an IMP cancellation signal that is either frequency hopped or continuous.

In another example embodiment, the subject matter of the second example embodiment can optionally include a sampling unit to sample a full passband to acquire the source signals, where the source signals create IMPs in the passband of interest in a receiver.

In another example embodiment, the subject matter of the second example embodiment can optionally include that a co-located transmitter, wherein the copies of the source signals are available from the co-located transmitter and copies of the source signals are sent to a receiver and wherein IMP cancellation signals are generated in the receiver and passive and active IMPs are cancelled in the receiver using a cancellation unit.

In another example embodiment, the subject matter of the second example embodiment can optionally include that source signals are acquired by either or both sampling or from a co-located transmitter.

In another example embodiment, the subject matter of the second example embodiment can optionally include a buffer to delay the source signals by an amount of time to allow for frequency hopped source signals to be identified and isolated to create the IMP cancellation signals.

In another example embodiment, the subject matter of the second example embodiment can optionally include a first filter to filter at least one of the IMP cancellation signals to pass only IMP components that will fall inband of the passband, the first filter being similar to a second filter used on the source signals.

In another example embodiment, the subject matter of the second example embodiment can optionally include that the cancellation unit is operable to cancel multiple IMPs simultaneously via a parallel process with one IMP cancellation per process.

In another example embodiment, the subject matter of the second example embodiment can optionally include that the cancellation unit is operable to cancel multiple IMPs simultaneously as a composite IMP signal of one or more IMPs, where the composite IMP cancellation signal set is generated by convolving the sum of the source signals with a mathematical model of a channel for active and or passive IMPs.

In another example embodiment, the subject matter of the second example embodiment can optionally include that each of the IMP cancellation signals becomes zero when one or more of the source signals is no longer present and only one source signal is left.

In another example embodiment, the subject matter of the second example embodiment can optionally include a search unit to scan source signals to determine when the IMPs are no longer present and to stop the cancellation process.

In another example embodiment, the subject matter of the second example embodiment can optionally include a sampling unit to sample a passband of source signals that continuous, frequency hopped and spurious, the signals processed as a single source signal that is multiplied by other source signals to create a single or multiple IMPs cancellation signal set.

In another example embodiment, the subject matter of the second example embodiment can optionally include that a passband of source signals is continuous, frequency hopped and spurious and is sampled and treated as a single source signal that is convoluted with a mathematical model of an amplifier or a nonlinear channel to effectively multiply the signals together to create an IMP cancellation signal set used to cancel IMPs in the passband of interest. In another example embodiment, the subject matter of this example embodiment can optionally include a first filter to filter the IMP cancellation signals to pass only IMP cancellation frequency components that fall inband of the passband of interest, the first filter being similar to a second filter used on the source signals.

In another example embodiment, the subject matter of the second example embodiment can optionally include a cross modulation processing unit to create a copy of the cross modulation IMP signal using a transmitter feed through to cancel cross modulation IMPs in the passband. In another example embodiment, the subject matter of this example embodiment can optionally include a first filter to filter the cross modulation IMPs to pass only those IMP frequency components that fall within the passband, the first filter being similar to a second filter used on the source signals.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
   an input to acquire a full passband of a transmitter;
   a processing path to convolve the full passband of the transmitter with a nonlinear model of the transmitter passband to create one or more composite intermodulation product (IMP) signals; and
   a cancellation unit operable to use the one or more composite IMP signals to cancel IMPs in the transmitter passband and out of band interference caused by a non-linear channel of the transmitter.

2. The apparatus of claim 1, wherein the composite IMP signal is a broadband IMP signal created by multiplying the transmitter passband signal by itself two or more times.

3. The apparatus of claim 1, wherein the processing path is performed at one location and control and calibration signals for the one or more composite IMP signals are passed to a receive signal of interest processing path.

4. The apparatus of claim 1, wherein the processing path is operable to perform frequency shifting one or more of the composite IMP signals to produce simulated intermodulation products, adjusted to compensate for phase, frequency and amplitude differences between the IMPS and the one or more composite IMP signals used for cancellation by the cancellation unit.

5. An apparatus comprising:
   an input to acquire copies of source signals;
   a first processing path to create intermodulation product (IMP) cancellation signals in response to the source signals, including compensating for differences between the IMP cancellation signals and IMPs in a band of a signal of interest by applying frequency, amplitude and phase adjustments for variances in frequency, amplitude and phase; and
   a cancellation unit operable to use the IMP cancellation signals to cancel IMPs in the signal of interest.

6. The apparatus of claim 5 wherein the first processing path is operable to determine the frequency, amplitude and phase adjustments by cross correlating one or more of the IMP cancellation signals with the signal of interest and adjusts the frequency, amplitude and phase to reduce the cross correlation between an IMP in the band of the signal of interest and the IMP cancellation signals.

7. A method comprising:
   processing a source signal that covers a full passband of a signal of interest, wherein the source signal is the signal of interest or has a same passband as the signal of interest;
   multiplying a passband in the signal of interest by itself three times to create intermodulation cancellation signal (ICS) for cancellation of the $3^{rd}$ order intermodulation signals centered in the passband of the signal of interest including the out of band interference; and
   convolving the signal of interest with a mathematical model of the nonlinearity to create an ICS signal.

8. A method comprising:
   creating an estimate of all the $3^{rd}$ order intermodulation products (IMPs) by cubing a full passband of a signal of interest to create all of the potential $3^{rd}$ order IMPs including the IMP caused by the signal of interest, wherein the full passband includes all source signals that can create IMPS in the passband of the signal of interest;
   filtering an estimate of all of the higher order IMPs to pass only those IMPs components that fall within the passband of the signal of interest to create an IMP cancellation signal (ICS);
   canceling the IMPs in-band of the signal of interest using the filtered estimate; and
   adjusting the ICS in phase and amplitude to improve the cancellation process.

9. A method comprising:
   create an estimate of all the intermodulation products (IMPs) by convolving a full passband of a receiver with a mathematical model of the nonlinearity (a power series expansion) to create all of the potential IMPS including the IMP caused by a signal of interest, wherein the full passband includes all source signals that can create intermodulation products (IMP) in the passband of the signal of interest;
   filtering the estimate of all of the IMPS to pass only those IMPS components that fall within the passband of the signal of interest and create an IMP cancellation signal (ICS);
   cancelling the IMPs in-band of the signal of interest using the filtered estimate (ICS) as part of a cancellation process; and
   adjusting the ICS in phase and amplitude to improve the cancellation process.

* * * * *